Dec. 4, 1962 — A. SAMUELS — 3,066,417
AUTOMATIC FOOT MEASURING DEVICE
Filed Dec. 11, 1958 — 3 Sheets-Sheet 1

INVENTOR
ABE SAMUELS
BY
ATTORNEY

Dec. 4, 1962  A. SAMUELS  3,066,417
AUTOMATIC FOOT MEASURING DEVICE
Filed Dec. 11, 1958  3 Sheets-Sheet 2
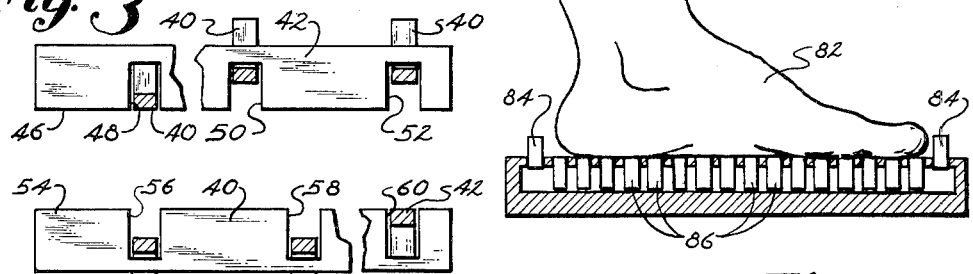
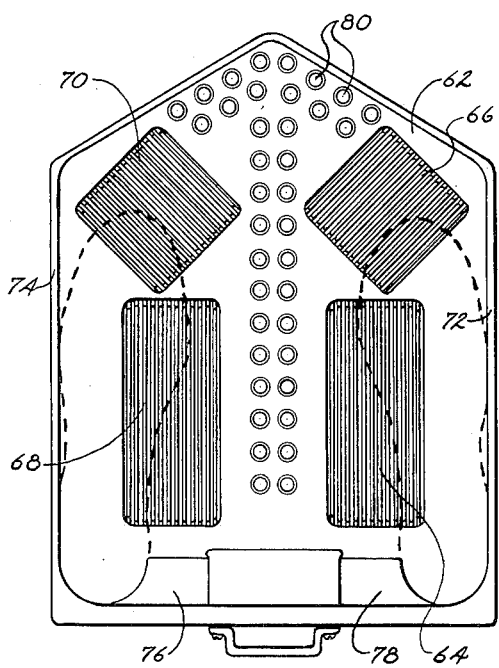
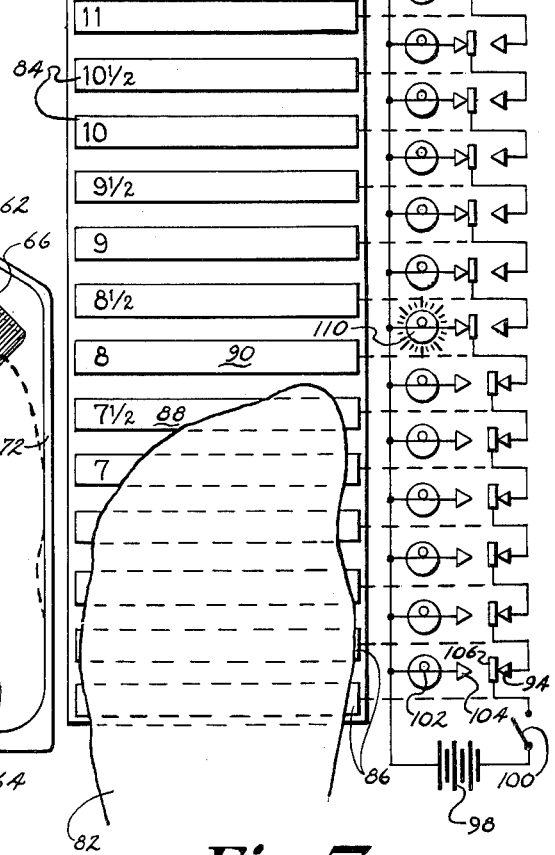
INVENTOR
*ABE SAMUELS*
BY
ATTORNEY Dec. 4, 1962  A. SAMUELS  3,066,417
AUTOMATIC FOOT MEASURING DEVICE
Filed Dec. 11, 1958  3 Sheets-Sheet 3

INVENTOR
*ABE SAMUELS*

BY
ATTORNEY

United States Patent Office 3,066,417
Patented Dec. 4, 1962

1

3,066,417
AUTOMATIC FOOT MEASURING DEVICE
Abe Samuels, 646 11th St., Douglas, Ariz.
Filed Dec. 11, 1958, Ser. No. 779,672
11 Claims. (Cl. 33—3)

This invention relates to foot measuring devices and more particularly is directed to a portable electrical unit for use as an aid in fitting the proper-size shoes to a human foot.

Although several devices are available for measuring the length and width of a human foot for general podiatric purposes as well as for the specific purpose of fitting shoes, applicant is unaware of any which provide a fully satisfactory compact unit suitable for use in retail shoe stores, the offices of foot specialists and the like. All of the known devices must either be manipulated by hand to provide a proper individual adjustment or, if automatic, are bulky and complex or do not provide an adequate indication of both the length and width of the human foot.

The present invention provides a novel, fully automatic foot measuring device of a size comparable to an ordinary bathroom scale which gives a visual indication of both the length and width of a foot when the person whose foot is being measured stands with either one or both feet on the unit. The weight of the foot on a plurality of cross bars or treadles energizes an electrical circuit to light a bulb giving a visual indication of the proper shoe size for the foot being measured. The unit is battery-operated and hence completely portable and may be carried about or propelled upon suitable rollers. It is relatively inexpensive to manufacture and completely reliable in operation.

It is therefore a primary object of the present invention to provide a novel automatic foot measuring device. Another object of the present invention is to provide a battery operated portable foot measuring device for use in fitting shoes.

Another object of the present invention is to provide a foot measuring device for giving a visual indication of both the length and width of a human foot.

Still another object of the present invention is to provide a foot measuring device capable of simultaneously recording the length and width of both a left and right foot.

An additional object of the present invention is to provide a foot measuring device that is fully automatic in response to the weight of a person whose foot is being measured.

These and other objects and advantages of the invention will be more apparent upon reference to the following specification, claims and appended drawings wherein:

FIGURE 3 is a cross-section through one of the depressable, resiliently mounted bars of the waffle structure shown in FIGURE 2;

FIGURE 4 is a cross-section through a bar at right angles to the bar shown in FIGURE 3;

FIGURE 5 is a plan view of a modified embodiment of the foot measuring device of the present invention employing separate length and width treadle sets;

FIGURE 6 illustrates the depressable nature of the cross-bars or treadles under the weight of a human foot;

FIGURE 7 illustrates a portion of the electrical indicating circuit incorporated in the foot measuring device of the present invention;

2

Figure 9:
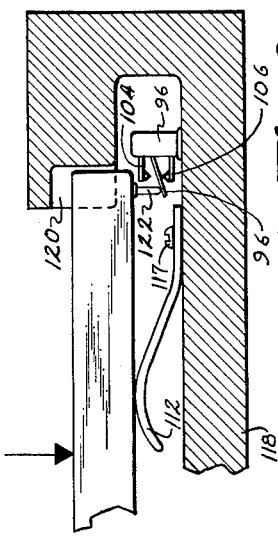
Figure 8:
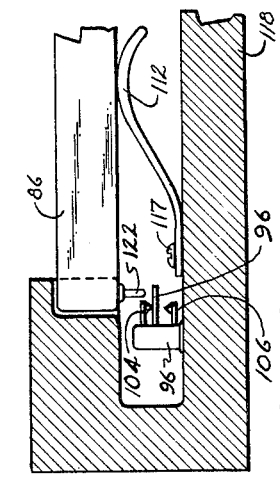
Figure 10:
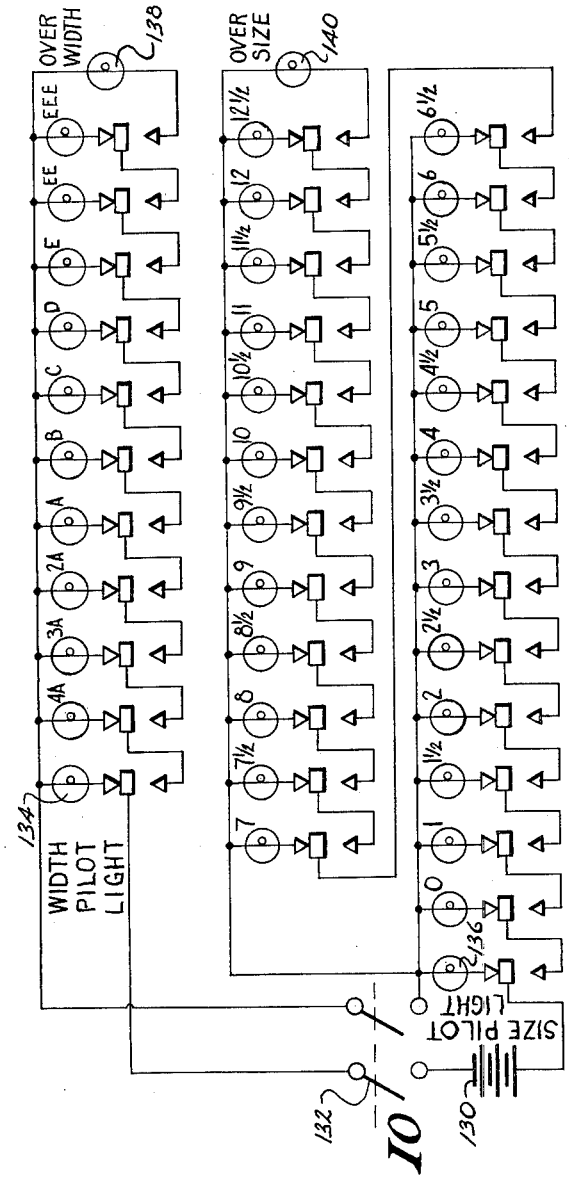

FIGURES 8 and 9 show the resilient mounting for a single treadle or cross-bar and indicate the actuation of the switches in the circuit of FIGURE 7; and FIGURE 10 is a complete circuit diagram for indicating the length and width of a foot as incorporated in the measuring device of the present invention.

Figure 1:
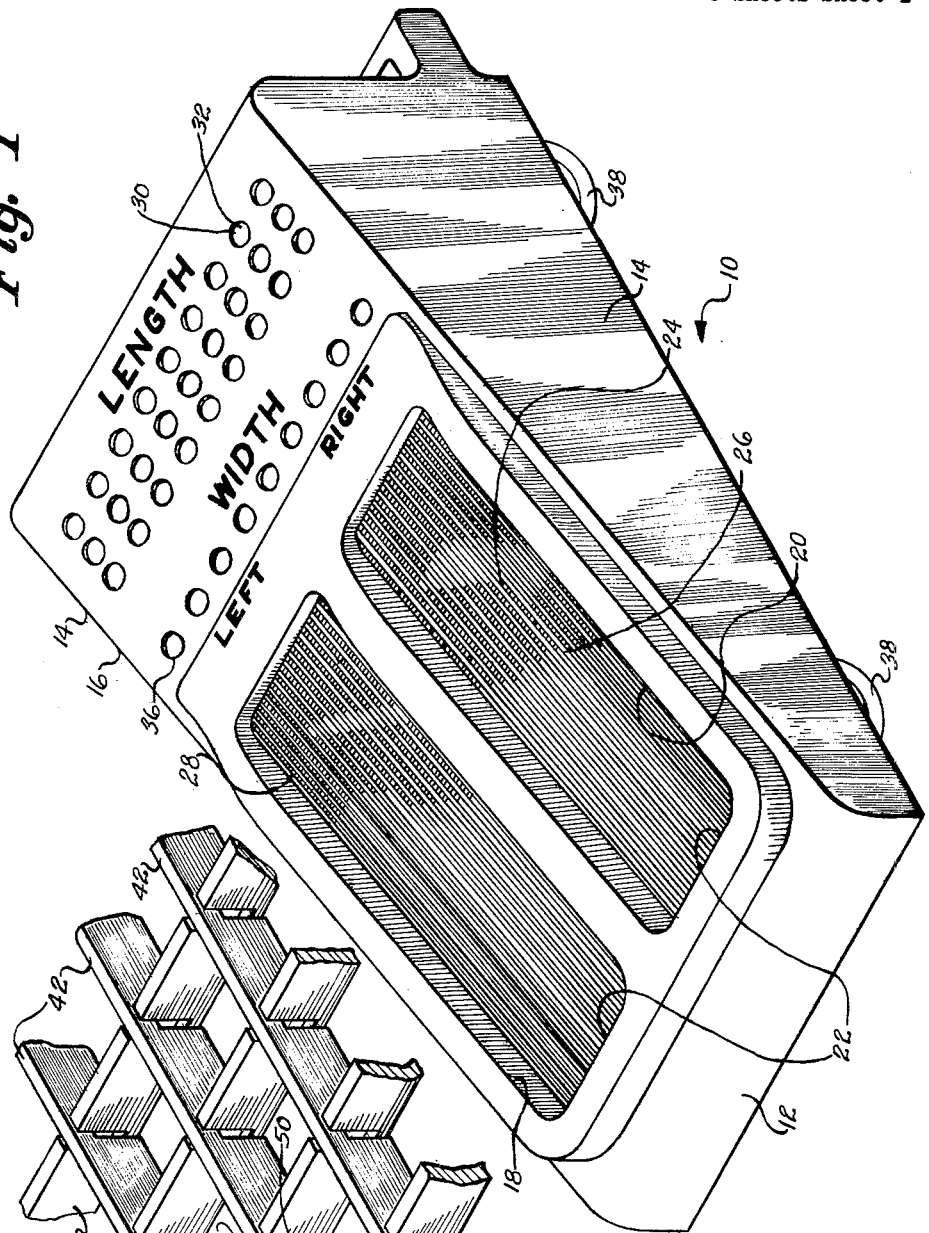
FIGURE 1 shows in perspective a preferred embodiment of the novel foot measuring device of the present invention.

Referring to the drawings, FIGURE 1 shows a preferred embodiment of the foot measuring device of the present invention generally indicated at 10, comprising a casing 12 including side walls 14 and a gradually sloping cover plate 16. As indicated in the drawing casing 12 may be formed with an integral cover plate 16 and side walls 14 to provide a single unitary housing formed of suitable lightweight metal, wood, or reinforced plastic.

Cover plate 16 includes a pair of upwardly extending spaced side flanges 18 and 20 joined by an upwardly extending rear flange 22. Received within the U-shaped area defined by side flanges 18 and 20 and rear flange 22 is a resiliently mounted, depressable surface 24 divided into right and left-hand sections 26 and 28 respectively adapted to be displaced by the weight of a foot bearing upon the surface. As shown in FIGURE 1, each of the sections 26 and 28 comprises a plurality of spaced parallel bars criss-crossing at right angles to form a waffle-like pattern. The transversely extending parallel bars upon being depressed by the foot provide an indication of the length or size of the foot whereas the perpendicular bars extending longitudinally of the unit upon depression correspondingly provide an indication of foot width.

A first set of light bulbs 30 in light sockets 32 are provided adjacent the upper end of cover plate 16 and in conjunction with suitable transparent indicia positioned over the bulbs give an indication of the length or size of the foot being measured. As will be apparent the particular location of the bulb energized is a representation of the proper shoe size for the foot. A similar set of bulbs 36 is provided to give a visual indication of foot width.

Upon placing one or both feet on the corresponding sections 26 and 28 of depressable surface 24 and bringing the edge of the foot into the abutment with the corresponding side flange 18 and 20 and the heel of the foot into abutment with rear flange 22, the number of transverse and longitudinal bars depressed gives an indication within the limits of bar spacing of the particular size of the foot or feet being measured. If desired, suitable retractable rollers 38 may be provided for readily and easily moving the unit about to any desired location.

Figure 2:
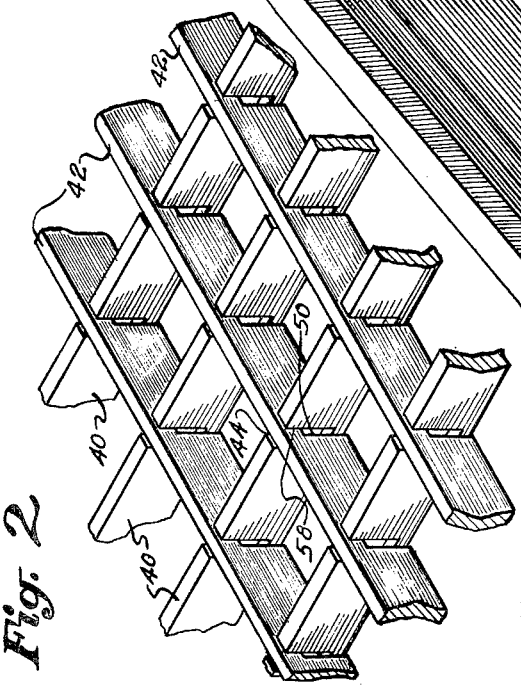
FIGURE 2 is an enlarged view of the waffle-like depressable surface incorporated in the unit of FIGURE 1.

FIGURE 2 is an enlarged perspective view of a portion of the depressable surface 24 of FIGURE 1 and shows a plurality of spaced criss-crossed parallel bars 40 and 42. While bars 40 and 42 are indicated as substantially rectangular in cross-section, it will be apparent that this is not critical and that any desired cross-section may be employed. In some instances it may be desirable to incorporate a wedge-shaped cross-section tapering toward the upper edge of each set of parallel bars. As can be seen in FIGURE 2, bars 40 and 42 intersect at right angles with one such intersection being indicated at 44. As indicated in FIGURE 2 and more clearly seen in FIGURES 3 and 4, each of the bars 42 is notched along its lower edge 46 as indicated at 48, 50 and 52 at spaced points corresponding to its intersection with perpendicular bars 40. As seen in FIGURE 4, each perpendicular bar 40 is similarly notched along the upper edge 54 at spaced points 56, 58 and 60 corresponding to the points of intersection of these bars with bars 42.

With the notches in each bar extending approximately three-quarters of the way through the bar and each notch positioned at the point of intersection of an individual bar with the spaced intersecting cross-bars, it is apparent that each individual bar may be depressed independently of its intersecting cross bars a distance equal to half the thickness of the bars. FIGURE 3, for example, shows bar 42 in a depressed position independent of the two right-hand bars 40 but with the left-hand bar 40 as shown in FIGURE 3 also depressed. Similarly, FIGURE 4 shows a bar 40 in its normal uppermost position with the two left-hand intersecting bars 42 depressed and the right-most cross bar 42 shown in FIGURE 4 also in its normal uppermost position.

FIGURE 5 is a plan view of a cover plate incorporated in a modified embodiment of the foot measuring device of the present invention showing a cover plate 62 including depressable right surface sections 64 and 66 and depressable left surface sections 68 and 70. Each of the sections 64, 66, 68 and 70 comprises a plurality of spaced parallel treadles also capable of being depressed to give an indication of foot dimensions. Longitudinally extending treadle sets 64 and 68 provide an indication of the width of a right and left foot respectively, while treadle sections 66 and 68 positioned above the section 64 and 68 and angled slightly with respect thereto provide corresponding indications of foot lengths or sizes. Upwardly extending side flanges 72 and 78 provide abutment surfaces for the edge of the foot being measured and heel plates 76 and 78 in a similar fashion provide rear abutment surfaces for the heel of a foot being measured. If desired, heel plates 76 and 78 may be adjustable to accommodate feet of varying widths. A plurality of light bulbs 80 with suitable indicia are provided to give an indication of both the length and width, with the particular location of the energized bulbs corresponding to the measured dimension.

FIGURE 6 illustrates the action of a plurality of parallel spaced cross-bars under the weight of a human foot indicated at 82. Bars 84 spaced from the heel and toe of foot 82 and not subjected to its weight remain in their normal uppermost position as indicated in the drawing, whereas bars 86 directly underneath the foot are depressed downwardly to the position shown. It will be understood that bars 84 and 86 represent either one set of the intersecting cross-bars of the waffle surface 24 in the embodiment of FIGURE 1 or any of the sets of parallel treadles in the embodiment of FIGURE 5, since in each embodiment the individual bars are supported for substantial downward displacement independently of adjacent or intersecting bars.

FIGURE 7 shows a portion of the electrical indicating circuit and illustrates the illumination of an individual bulb in response to the number of bars depressed by a foot. In this figure, only a single set of cross-bars is shown as giving an indication of the length of a foot outlined at 82 but it will be understood that the operation of the width bars, whether in the form of an intersecting waffle structure or as separate treadles function in a similar manner. Foot 82 in the position shown depresses all bars, starting from the first bar at the beginning end of the set where the battery is connected, up to and including bar labeled 88, whereas the bar labeled 90 and those beyond are not depressed but remain in their normal uppermost position. Each of the bars 84 and 86 is coupled as indicated by the dotted lines to the movable contact 94 of a series of microswitches 96 connected in the circuit with a series of lamps 92. Energy may be supplied to the lamps by a suitable power source illustrated by a battery 98 through an on-off switch 100. Bulb 102 is a pilot bulb and lights immediately upon the closing of switch 100 which completes the circuit through this bulb to battery 98.

Assuming that the last depressed bar or treadle is that indicating size 7½ as illustrated in FIGURE 7, the movable elements 94 of each microswitch 96 mechanically coupled to these treadles will be transferred from upper stationary contacts 104 to lower stationary contacts 106. However, those movable microswitch elements coupled to the bars or treadles beyond size 7½ remain in engagement with upper contact 104 and are therefore not displaced. Hence, pilot light 102 and indicator lights corresponding to sizes 4 through 7½ are open circuited with displaceable elements 94 against lower contacts 106. Similarly indicator bulbs corresponding to sizes 8 and above remain open circuited with movable elements 94 against upper contacts 104. It will be noted, however, that a single circuit is completed through a bulb 110. In all instances the bulb energized is the one with a terminal contacting the first switch having a displaceable element 94 not displaced under the influence of a depressed treadle. Consequently, only a single bulb circuit is completed and the position of this bulb in the series corresponds to the number of depressed treadles and hence is an indication of the proper shoe size for the foot being measured.

FIGURES 8 and 9 illustrate the action involved in tripping one of the microswitches 96 upon depression of a cross bar or treadle 86. Each of the treadles may be individually supported by a plurality of spaced springs, one of which is indicated in FIGURES 8 and 9 at 112. The upper end of springs 112 bear against the underside of the treadle 86 and the opposite end is secured to base 118 by suitable fastening means such as screw 117. If desired, spacer elements 120 may be positioned between each bar at either end thereof to act as guide means to restrain each of the bars 86 against excessive lateral movement.

Upon the application of pressure due to the weight of the foot as indicated by the arrow in FIGURE 9, bar or treadle 86 is depressed so that downward projection 122 located at one end of the bar 86 engages the end of a spring member made of spring steel or similar material constituting the displaceable element or contact 94 of microswitch 96. In FIGURE 8 spring member 94 is shown as engaging upper stationary contact 104 and in FIGURE 9 it is shown as depressed by projection 122 so as to engage lower stationary contact 106. While microswitches 106 are indicated as positioned along the edge of the unit beyond the ends of the bars 86, it will be apparent that the switches may be positioned if desired underneath the treadle, so that movement of the treadle causes the switch to open a first circuit and close a second circuit by means of an intermediate movable switch element. Similarly, while the bars or treadles 86 may be supported only at the two ends, it will be apparent that further intermediate spring support means may be employed and that the springs may take a variety of forms. Alternately, the bars or treadles may be pivoted at one end so that only the end of the treadle shown in FIGURES 8 and 9 moves to actuate a microswitch 96.

FIGURE 10 shows a complete wiring diagram of the width and size indicating circuit for a single foot. While the embodiment shown in FIGURES 1 and 5 provide for the simultaneous measurement of both feet, it will be apparent that the unit may be constructed so as to measure only one foot at a time. In such a case, the circuit of FIGURE 10 would constitute the complete circuit for the unit. However, in the embodiments described a second circuit identical to that shown in FIGURE 10 would ordinarily be employed for obtaining measurements of a second foot.

In FIGURE 10, the entire unit is supplied by a three-volt battery 130 through a double-pole single-throw switch 132. In this figure the width indicator bulbs are numbered 4A through EEE with each number indicating a conventional shoe width. Similarly, the length or size bulbs are numbered 0–12½, also indicating conventional shoe sizes. The first bulb in each series of lights, that is, in both the width series and length series constitutes a pilot light which is illuminated upon the closing of switch 132 to indicate that the unit is energized. The width and size pilot lights are indicated respectively at 134 and 136.

Similarly, at the end of each series of lights is an overwidth and oversize bulb respectively, which give indications in the very unusual situations wherein the foot being measured is larger than the conventional sizes for which the device is constructed. In such a case all of the treadles would be depressed and the circuit completed through the overwidth bulb 138, if the foot was extra large in width and a similar circuit would be completed through the oversize bulb 140 if the foot was unusually long. It will be understood that the device may be constructed to include any number of lights so as to measure almost any size foot. However, as a matter of practicality, it is desirable to provide indications of unusual sizes in the very few instances in which they may occur.

The present invention provides a novel foot measuring device particularly suited as an aid in fitting shoes. The device is compact and portable, being operated by relatively small batteries, and gives an automatic visual indication of both the length and width of either one or both feet as desired. The unit is of relatively simple, rugged construction and includes the feature of providing an indication of foot dimensions with the person whose foot is being measured in a normal standing position with his weight applied as would be the case in normal standing and walking in a pair of shoes. Hence, the resulting measurement is a true and accurate indication of the proper shoe for the foot being measured.

It will be apparent that various modifications within the scope of the present invention may be incorporated into the unit in the form of other type support means and different cross-bar or treadle configurations as well as any type of display pattern. By way of example only, the spacing from center-to-center of the parallel bars for indicating foot length may be approximately 1/16 of an inch. The center-to-center spacing of the parallel bars or treadles for indicating foot width may be approximately 3/16 of an inch. Likewise, while the cross-bars forming the waffle-like pattern of the embodiment shown in FIGURE 1 have been described as having notches extending approximately 3/4 of the way through, it is apparent that the particular length of the notches is dependent upon the movement necessary to actuate the microswitches and may be varied in accordance with the particular design and application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A foot measuring device comprising first and second sets of elongated spaced parallel bars, each set comprising a first bar at one end of said set and a plurality of other bars, said bars being depressable under the weight of a human foot, electrical means connected to said first set of bars and actuated by the depression of one or more consecutive bars, including the first bar and responsive to the number of depressed bars in said first set for visually indicating a first dimension of a foot being measured and electrical means connected to said second set of bars and actuated by the depression of one or more consecutive bars, including the first bar and responsive to the number of depressed bars in said second set for visually indicating a second dimension of a foot being measured.

2. A foot measuring device according to claim 1 in which said first and second dimensions are length and width.

3. A foot measuring device according to claim 2 in which said indicating means comprise a first and second series of lights, and means for energizing one of said lights in each series at a position indicative of the number of bars depressed.

4. A foot measuring device comprising first and second sets of elongated spaced parallel bars, each set comprising a first bar at one end of said set and a plurality of other bars, means resiliently supporting each of said bars independently for depression under the weight of a human foot, and electrical means connected to said set of bars and actuated by the depression of one or more consecutive bars, including the first bar and responsive to the number of depressed bars in each set for visually indicating the length and width of a foot being measured.

5. A foot measuring device according to claim 4 including reference means for positioning one side and the heel of a foot with respect to said bars.

6. A foot measuring device as defined in claim 5 in which the centers of said bars are spaced a predetermined distance apart in accordance with the differing dimensions of a series of shoe sizes.

7. A foot measuring device according to claim 6 in which said indicating means comprises a first and second series of electrical lights for said first and second sets of bars and switch means for energizing a single light in each series at a position representative of the number of depressed bars in said corresponding set.

8. A foot measuring device comprising first and second sets of elongated spaced parallel bars, each set comprising a first bar at one end of said set and a plurality of other bars, said first and second sets of bars intersecting at right angles to form a depressible waffle-like surface, means resiliently supporting each of said bars independently for depression under the weight of a human foot, and means connected to said sets of bars and actuated by the depression of one or more consecutive bars, including the first bar and responsive to the number of depressed bars in each set for indicating the length and width of a foot being measured.

9. A foot measuring device according to claim 4 in which said first and second sets of bars each include two separate groups for simultaneously measuring a pair of feet.

10. A foot measuring device according to claim 8 in which the bars in said first set are notched along their lower edges and the bars in said second set are notched along their upper edges, with the center of each notch in said first set in vertical alignment with the center of a corresponding notch in said second set whereby said each set of bars may be depressed a substantial distance independently of the bars in said other set.

11. A foot measuring device comprising first and second sets of elongated spaced parallel bars, each set comprising a first bar at one end of said set and a plurality of other bars, said sets of bars being spaced apart and comprising a series of similarly constructed treadles, the bars in one set being positioned at an acute angle to the bars in the other set, means resiliently supporting each of said bars independently for depression under the weight of a human foot, and means connected to said sets of bars and actuated by the depression of one or more consecutive bars, including the first bar and responsive to the number of depressed bars in each set for indicating the length and width of a foot being measured.

References Cited in the file of this patent

UNITED STATES PATENTS

| | | |
|---|---|---|
| 2,162,916 | Hyland | June 20, 1939 |
| 2,216,533 | Kaplan | Oct. 11, 1940 |
| 2,330,317 | Stewart | Sept. 28, 1943 |
| 2,331,177 | Del Presco | Oct. 5, 1943 |
| 2,876,544 | Kallmeyer | Mar. 10, 1959 |